US011308754B1

(12) United States Patent
Cardno et al.

(10) Patent No.: US 11,308,754 B1
(45) **Date of Patent: *Apr. 19, 2022**

(54) GAMING SYSTEMS AND METHODS INCLUDING FEATURE FOR TRANSFORMING NON-RANDOMLY GENERATED OUTCOME INTO ENTERTAINMENT GAMING OUTCOME

(71) Applicant: Quick Custom Intelligence, LLC, Las Vegas, NV (US)

(72) Inventors: Andrew Cardno, San Diego, CA (US); Daniel Cardno, San Diego, CA (US); Ralph W Thomas, Las Vegas, NV (US); Ralph J Thomas, Las Vegas, NV (US)

(73) Assignee: Quick Custom Intelligence, LLC, Las Vegas, NV (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/782,052

(22) Filed: Feb. 4, 2020

Related U.S. Application Data

(63) Continuation-in-part of application No. 16/141,959, filed on Sep. 25, 2018, now Pat. No. 11,094,163.

(Continued)

(51) Int. Cl.
*A63F 9/24* (2006.01)
*A63F 11/00* (2006.01)

(Continued)

(52) U.S. Cl.
CPC ...... *G07F 17/3225* (2013.01); *G07F 17/3267* (2013.01)

(58) Field of Classification Search
USPC ........................ 463/1, 20, 22, 25, 30, 31, 39
See application file for complete search history.

(56) References Cited

U.S. PATENT DOCUMENTS 4,582,324 A * 4/1986 Koza ...................... A63F 13/67 463/16
2006/0046816 A1* 3/2006 Walker ................ G07F 17/3293 463/13

(Continued)

*Primary Examiner* — Adetokunbo O Torimiro
(74) *Attorney, Agent, or Firm* — Newman Law, LLC

(57) ABSTRACT

An entertainment gaming system and method for transforming a non-random number outcome into an entertainment gaming outcome. The entertainment gaming system comprises a central server, non-random number outcome generator machine, entertainment gaming machine, and database. The central server communicatively coupled with non-random number outcome generator machine and entertainment gaming machine. The entertainment gaming system collects non-random number based outcome from real-world events and transmitting it to the central server. The central server further utilizes an algorithm to process the received non-random number outcome into an entertainment gaming outcome. Further, the present entertainment gaming system comprises a database to store the received real-world non-random number based outcome and processed entertainment gaming outcome generated from the received non-random number based outcome. The central server then transmits the processed outcome in the form of an entertainment gaming outcome to the entertainment gaming machine to generate and render a game result.

20 Claims, 4 Drawing Sheets

Related U.S. Application Data

(60) Provisional application No. 62/801,081, filed on Feb. 4, 2019.

(51) Int. Cl.

| | |
|---|---|
| ***G06F 13/00*** | (2006.01) |
| ***G06F 17/00*** | (2019.01) |
| ***G07F 17/32*** | (2006.01) |

(56) References Cited

U.S. PATENT DOCUMENTS

| | | | | |
|---|---|---|---|---|
| 2008/0275824 A1* | 11/2008 | Assia | G06Q 40/04 | 705/36 R |
| 2009/0117988 A1* | 5/2009 | Mathis | G07F 17/34 | 463/20 |

* cited by examiner

GAMING SYSTEMS AND METHODS INCLUDING FEATURE FOR TRANSFORMING NON-RANDOMLY GENERATED OUTCOME INTO ENTERTAINMENT GAMING OUTCOME

CROSS-REFERENCE TO RELATED APPLICATIONS

This application claims the priority benefit of U.S. Provisional Patent Application No. 62/801,081 filed Feb. 4, 2019, and is a continuation in part of U.S. non-provisional application Ser. No. 16/141,959 filed Sep. 25, 2018, which in turn claims the priority benefit of: U.S. Provisional Patent Application No. 62/563,061 filed Sep. 25, 2017; U.S. Provisional Patent Application No. 62/565,642 filed on Sep. 29, 2017; U.S. Provisional Patent Application No. 62/594,477 filed on Dec. 4, 2017; U.S. Provisional Patent Application No. 62/614,628 filed on Jan. 8, 2018; and U.S. Provisional Patent Application No. 62/634,758 filed on Feb. 23, 2018. The disclosures of all of these applications are incorporated herein by reference.

BACKGROUND OF THE INVENTION

The present invention relates to an entertainment gaming system, in particular to an entertainment gaming system and method for transforming a non-random number outcome into an entertainment gaming outcome.

The outcome of most gambling gaming machines, such as slot machines is controlled by a random number generated on occurrence of the triggering event, such as but not limited to, pressing a button or pulling a lever on the machine by the user on a physical slot machine (offline scenario) or clicking on a user interface button on a computing machine (online scenario). Thus, a random number generated as a result of above-explained scenario, on the slot machine or computing machine decides whether the player has won or lost. The physical slot machine or computing machine further comprises a controller. The random number outcome of the gambling games is generated by the random number generator or software algorithm executed by the controller. The gambling games include but are not limited to Slot Reels, Video Slots, Video Poker, Blackjack, Craps, Baccarat, Poker, Video Games, Games that mix skill and random numbers, etc.

Traditionally, random number generator or software algorithm to be executed by the controller is designed or programmed to achieve a certain payback percentage. The payback percentage is the percentage of the total money put in by all of the players that are eventually paid out to the winning player(s). A disadvantage of using random number generator to determine the outcome of gambling games is that the casino would take about 10 percent of all money put into the slot machine and give away the other 90 percent which means the players are always playing against the house advantage. Another disadvantage with the traditional random number based games is that providing these games online and deciding the winner using random numbers is illegal in many countries.

Therefore, there is a need of an entertainment experience where the users do not have to play against the house advantage and have the maximum probability of winning the game, and in fact are participating in the legal activity of (in one embodiment) financial investing.

Currently, the gambling games that utilize a random number generator to provide the outcome are not transparent and do not allow the players to track the outcome of every payout. Therefore, there is a need for an entertainment gaming system to provide a platform where the users do not have to play against the house advantage and have the maximum probability of winning the game. Further, there is a need for an entertainment gaming system to utilize blockchain based cryptocurrency to provide transparency to a non-random number outcome generator (NRNG) machine. Furthermore, there is a need for an entertainment gaming system that allows a player to track the outcome of every payout in a blockchain, thus allowing every player access to the full details of how the non-random number outcome generator (NRNG) machine is performing and what the paytables are proving to be as the games are being played.

Cryptocurrencies are rapidly growing and have started to see wide adoption all over the world. The cryptocurrency mining includes two main functions such as adding transactions to the blockchain (secure and verify) and also releasing new currency. The individual blocks added by the miners should contain a proof-of-work (PoW).

The cryptocurrency miners utilize a computer and a specific program to mine the cryptocurrency. The computer and the specific program help the miner to compete with their peers in solving the complex computational problems. In regular intervals, miners attempt to solve a block having the transaction data using cryptographic hash functions. The hash value is a numeric value of fixed length that uniquely identifies data. Miners use their computer to zero in on a hash value less than the target and whoever is the first to crack it would be considered as the one who mined the block and is eligible to get a reward.

To accomplish the above process of mining, a miner would need expensive computer resources. Further, the miner has to pay a large amount in electricity bills. Thus, large-scale miners and organizations dominate the cryptocurrency market. Existing solutions utilize a pooling mechanism, where various users can invest and un-invest as they wish into one or more pools of users, where each pool can mine cryptocurrency on a larger scale. However, the size of the pools frequently expand and contracts as users enter and exit the program. Additionally, the existing prior arts fail to provide a system and method to create an entertaining game based on crypto mining so that a user can invest for short-term in mining pools to generate a paytable that may simulate a gaming outcome.

Therefore there is a need for a system and a method to intelligently size each group of mining computers so that the mining computers correspond to the number of users assigned to a pool of investments. Further, there is also a need for a system and a method which can minimize an error function of a discrete injection function between the pools and the mining computers. Furthermore, there is also a need for a system and a method to create a game where a short-term investment in one or more mining pools generates a paytable that simulates the gaming outcome.

In casino gaming, the win-losses are not recorded for public audit, in other words, they are kept private to the operator. The customer is required to trust that the casino operator is setting the games as advertised. The taxation is a burdensome process for casinos and their customers because the customers have to fill out extra paperwork for large jackpots, and then ask casino for the end of year win/loss reports. Further, the loyalty points at both online and land-based casinos are generally not transferable, and often the points expire and are taken away from the customer.

Additionally, it is difficult to track whether an advertisement or a recommendation will be effective in bringing revenue to a company. Currently, companies track the referral pay-outs by monitoring which site a person came from to get to their website or by having a loyalty/signup program whereby the person agrees to share their information.

Players would like a way to track their odds and more effectively predict their future probability of victory and to ensure the odds are not being skewed against them. Cryptocurrency enthusiasts need a way to play using their money in land-based casinos.

Furthermore, it is rare for any random set of numbers to not involve a certain amount of streakiness, for instance, if one were to flip a coin 100 times it would be statistically unlikely for those coin flips to alternate heads and tails, rather we would see streaks of heads and tails with an overall average of around 50% to each side. The way that this translates into the gaming industry is quite clear when it comes to slots as players will often experience bouts of continued winning or go on losing streaks.

Generally, casino gaming devices trade in one currency—in the U.S. the currency is dollars. While some are trying to modify this to replace dollars with cryptocurrency, this seems to be a bridge too far. To get gaming customers who use dollars (or other government-backed currencies) introduced into cryptocurrencies (such as Bitcoin, Etherium, Litecoin).

Therefore there is a need for traditional gaming devices to award these cryptocurrencies as part of the special jackpot awards. These jackpot awards can either be part of the gaming hold percentage calculation (wherein the award is included as part of the customer payout calculation) or separate from the game entirely wherein the award is considered a marketing expense. This marketing expense can be supported by the casino or from the cryptocurrency holder, and the jackpot award availability can be tied to the customer, wherein a customer who participates in the cryptocurrency via an online platform (e.g., an online game that uses the cryptocurrency) may qualify for the jackpot based on their participation. Further, there is a need for a system and method to provide an integrated platform to facilitate online casino game and land-based casino game over a network.

Thus, in view of the above, there is a long-felt need in the industry to address the aforementioned deficiencies and inadequacies, among others.

SUMMARY OF THE INVENTION

Various embodiments of the invention are generally directed to solving the aforementioned issues, among others.

In some embodiments of the invention, there is provided an entertainment gaming system and method for transforming a non-random number outcome into an entertainment gaming outcome. The entertainment gaming system comprises a central server, a non-random number outcome generator machine, an entertainment gaming machine, and a database.

The central server communicatively coupled with a non-random number outcome generator machine and an entertainment gaming machine which further comprises a controller. Examples of the non-random number outcome generator machine including but not limited to a stock or securities trading computing machine, a high-frequency trading computing machine, and a high volatility ETF machine. The entertainment gaming system is configured to collect non-random number based outcome from real-world events such as but not limited to stock or securities trading, high-frequency trading, high volatility ETF, etc. and transmitting it to the central server.

The central server comprises a transceiver to receive non-random number outcomes from the real-world event. The central server further utilizes an algorithm to process the received non-random number outcome into an entertainment gaming outcome. Further, the present entertainment gaming system comprises a database to store the received real-world non-random number based outcome and processed entertainment gaming outcome generated from the received non-random number based outcome. The central server then transmits the processed outcome in the form of an entertainment gaming outcome to the entertainment gaming machine to generate and render a game result.

The gaming experience could include playing on any platform through which random events can be simulated, such as electronic table games, video games and online gaming machines; such as online games of skill (played through terminals), personal computers or mobile devices.

In one aspect, the market data such as movements or changes, which may be general changes or changes relative to specific positions, are translated into different forms of random events including triggering encounters in a skill based game or dictating the outcome of a decision or results of a decision on an online video game machine which can then be displayed to players.

In another aspect, the market data may form the basis for determining outcomes relative to input received through an interface of the invention which can then be simulated as skill-based games and outcomes through any of the aforementioned platforms of the present invention.

The above gaming experience includes individual skill based game targets. In an exemplary embodiment, the player enters a challenge (for example a video game obstacle course) with milestones and the reward for each milestone is participation in one or more outcomes from the real world non-random number outcome generator machine such as but not limited to stock or securities trading computing machine, high-frequency trading computing machine, high volatility ETF, etc.

Accordingly, one advantage of the present invention is that it incorporates the non-random number outcome from financial trading into entertainment gaming outcome of the entertainment games so that the users do not have to play against the house advantage and have the maximum probability of winning the game, as they are participating as investors.

Accordingly, another advantage of the present invention is that the outcome from the financial trading is non-random. The online gaming outcomes are based upon any financial trading, or any other non-random number based outcome event would be classified the same way as financial trading in a given country or legal system, therefore making out the present system resilient to laws regarding gambling that uses random number generators. The rendering of the games may include but is not limited to information giving the players, hints about the current metrics of the market including volatility or trends, or other information in the public domain relating in any way to the non-random outcomes.

According to embodiments illustrated herein, there is further provided a system and method that efficiently, economically, and intelligently size a plurality of mining computers and further assign the mining computers corresponding to a pool of a plurality of users with investments. The method that includes the step of grouping the users into one or more pools, where short-term investments of the users lead to an outcome that resembles a random number generated an event, without the use of a random number generator. In particular, smaller pools lead to larger volatility in the outcomes, and larger pools lead to smaller volatility in the outcomes. Further, the breaking investments up into a number of pools lead to a wide variety of different outcome signatures.

In an aspect, the method manages the error function from an operational perspective of at least one of taking or distributing mined cryptocurrency and after that buying or leasing or utilizing the mining computers. The present method minimizes the error function of the discrete injection function between the pools and the mining computers. Further, the discrete injection function with a continuous error function, map the investments of the user with the mining computers.

In an aspect, the method further enables an operator to create a game by sizing the pools and/or mining computers where a short-term investment in one or more mining pools lead to an outcome to provide a plurality of probabilities with different levels of reward, without using a random number generator. The outcomes are a direct result of mining for the cryptocurrency.

Accordingly, one advantage of the present invention is that it intelligently sizes each group of mining computers so that the mining computers correspond to the number of users assigned to a pool.

Another advantage of the present invention is that it minimizes an error function of a discrete injection function between the pools and the mining computers.

Still another advantage of the present invention is that it creates an entertainment game where a short-term investment in one or more mining pools to generate a paytable that simulates the gaming outcome.

According to embodiments illustrated herein, there is furthermore provided a system to provide an integrated platform to facilitate online casino game and land-based casino game over a network. The system includes a processor and a memory. The memory stores machine-readable instructions that when executed by the processor cause the processor to track the wins and losses on a cryptocurrency bet through a win-loss tracking module.

Further, the processor is configured to automatically pay tax on a plurality of betting events through a taxation module. The processor is further configured to build loyalty points as a blockchain, and further allows users to transfer loyalty points through a loyalty module. Then the processor is configured to use a plurality of unusual crypto events in blockchain mining to drive large jackpots through a jackpot module integrated with the land-based casino machine.

The processor is further configured to pay affiliate payouts on a plurality of gambling events directly to the public blockchain through a referral pay-outs module. The processor is further configured to store the win-loss history in public ledger, and trigger a winning response by smart contract through a wallet streakyness module.

Furthermore, the processor is configured to convert to cryptocurrency and play out a ten-second event through a non-random number generator (NRNG) driven jackpot module. The processor is further configured to award cryptocurrency as part of special bricks and mortar jackpots through a cryptocurrency jackpot module integrated with a plurality of gaming devices.

In an aspect, the win-loss tracking module utilizes the blockchain mechanism so that each time a game is played the blockchain is extended to show the outcome of the gaming event. Further, each time a coin (or partial coin) transfers ownership due to a gaming event the win-loss relationship is tracked.

In an aspect, the taxation module utilizes the blockchain smart contract which directly applies the taxation requirements as each transaction occurs. Further, the blockchain smart contract contains all data required for taxation reporting and (possibly open source) program accompanies the blockchain to automatically produce taxation reporting requirements and supporting documentation.

In an aspect, the loyalty points are tracked via a smart contract assigned to the blockchain cryptocurrency, customers and companies' alike benefit from the transparent/transferrable loyalty program. The program starts when a customer makes a purchase or otherwise engages in a transaction with a company that is participating in the cryptocurrency and its associated loyalty program. The engage of cryptocurrency with the company triggers a transfer of the loyalty points currency (of equal currency amount) which contains the loyalty points and the smart contract needed to exchange/redeem/expire these loyalty points. Upon redemption or expiration, the loyalty currency expires, as dictated by the smart contract. The loyalty currency is transferable, and can also be sold at a market-determined price, either for crypto or government-backed (fiat) currency.

In an aspect, the land-based casino spends a portion of the player's deposit on processing power. Further, the land-based casino machine is already invested in this power and if the player hits the correct combination wins a pool of the previous earnings of the land-based casino machine.

In an aspect, the smart contract directly applies the affiliate pay-out each time a transaction occurs. The affiliate pay-out is stored in the blockchain and paid out at regular intervals to the relevant affiliate.

In an aspect, each time a game is played the blockchain is extended to show the outcome at which point it is determined whether the player is on a streak and what to do about said streak. Further, the streakyness of the coin is used rather than the streakyness of the player. The streakyness can be wins, losses or combinations of the two.

In an aspect, the non-random number generator (NRNG) is built by looking at market values over a certain period. Further, the NRNG is built into the machine and can be accessed offline. Additionally, the pay-out can be in a currency of the winners' choice.

In an aspect, if the present cryptocurrency jackpot module is integrated with a gaming device, the random number generator (RNG) of the gaming device directly determines when a crypto jackpot is to be awarded. In another aspect, if the present cryptocurrency jackpot module is not integrated with the gaming device and acts as a separate application, a plurality of gaming devices are connected to the cryptocurrency jackpot module. The outcomes of the gaming device, including but not limited to a streak of losses, can trigger the application to award the crypto jackpot to one or more gaming users. In another aspect, the present invention may function as a separate application which is available to the table games dealers/pit bosses/other employees as appropriate. Outcomes of the table game (for example, an outlier event like a royal flush is achieved on three card poker) trigger the employee to notify the application of the award and the user to receive the award.

Some embodiments of the invention are directed to a gaming system comprising: a central server in communication with the real world non-random number outcome generator machine for receiving a non-random number based outcomes in connection with a real world event; a controller configured to associate received non-random number based outcomes with game outcomes in a gaming machine, the non-random number based outcomes comprising one or more securities positions subject to market fluctuations, wherein the controller processes the non-random number based outcomes in combination with an algorithm, the algorithm being configured to use historical volatility of the one or more securities to determine probable future pricing for the one or more securities, wherein the controller further uses the probable future pricing for the one or more securities and the received non-random number based outcomes for the one or more securities to determine a game outcome played on the gaming machine; a communication device configured to transmit the game outcome of the gaming machine; and a processor for generating the transmitted game outcome to the gaming machine.

Some embodiments of the invention are directed to a gaming system comprising: a central server in communication with the real world non-random number outcome generator machine for receiving a non-random number based outcomes in connection with a real world event; a controller configured to associate received non-random number based outcomes with game outcomes in a gaming machine, wherein the controller in combination with an algorithm determines a game outcome played on the gaming machine; a communication device configured to transmit the game outcome of the gaming machine; and a processor for generating the transmitted game outcome to the gaming machine.

In an embodiment of the present invention, a gaming system and method comprises a central server in communication with the real world non-random number outcome generator machine such as but not limited to stock or securities trading computing machine, high-frequency trading computing machine, high volatility ETF etc. and an entertainment gaming machine which further comprises a controller. The entertainment gaming system and method of the present invention is configured to collect non-random number based outcome from a real-world event such as but not limited to stock or securities trading, high-frequency trading, high volatility ETF etc. and transmitting it to the central server. The central server further comprises a transceiver to receive non-random number outcome from the real-world event, an algorithm to process received non-random number outcome into an entertainment gaming outcome, which may include a database to store received real world non-random number based outcome and processed entertainment gaming outcome generated from the received non-random number based outcome. The central server further transmits the processed outcome in the form of an entertainment gaming outcome to the entertainment gaming machine to generate and render the game result. This game result may be rendered into any form of game that otherwise requires a random number generator to determine the outcome.

In another embodiment of the present invention, a gaming machine and method comprises an entertainment gaming machine in direct communication with the real world non-random number outcome generator machine such as but not limited to stock or securities trading computing machine, high-frequency trading computing machine, high volatility ETF etc. The entertainment gaming system and method of the present invention is configured to collect non-random number based outcome from a real-world event such as but not limited to stock or securities trading, high-frequency trading, high volatility ETF etc. The entertainment gaming machine comprises a transceiver to receive non-random number outcome from the real-world event, an algorithm to process received non-random number outcome into an entertainment gaming outcome, which may include a database to store received real world non-random number based outcome and processed entertainment gaming outcome generated from the received non-random number based outcome. The entertainment gaming machine then generates and renders the game result. This game result may be rendered into any form of game that otherwise requires a random number generator to determine the outcome.

In another embodiment of the present invention, a gaming system and method of the present invention further comprises a financial trading computing machine such as but not limited to stock or securities trading computing machine, high-frequency trading computing machine, high volatility ETF etc. in communication with the central server communicating non-random number based financial trading outcome on a regular basis. The central server further communicates this outcome to the entertainment gaming machine to generate the game result.

Advantage of the incorporation of non-random number outcome from financial trading into entertainment gaming outcome of the entertainment games is that the users do not have to play against the house advantage and have the maximum probability of winning the game, as they are participating as investors. Also, as the outcome from the financial trading is non-random, online gaming outcome based upon any kind of financial trading or any other non-random number based outcome event would be legal as required by the various country laws. The rendering of the games may include but is not limited to information giving the players, hints about the current metrics of the market including volatility or trends, or other information in the public domain relating in any way to the non-random outcomes.

Other features of embodiments of the present disclosure will be apparent from accompanying drawings and the detailed description that follows.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention. In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF SOME EMBODIMENTS OF THE INVENTION

Figure 1:
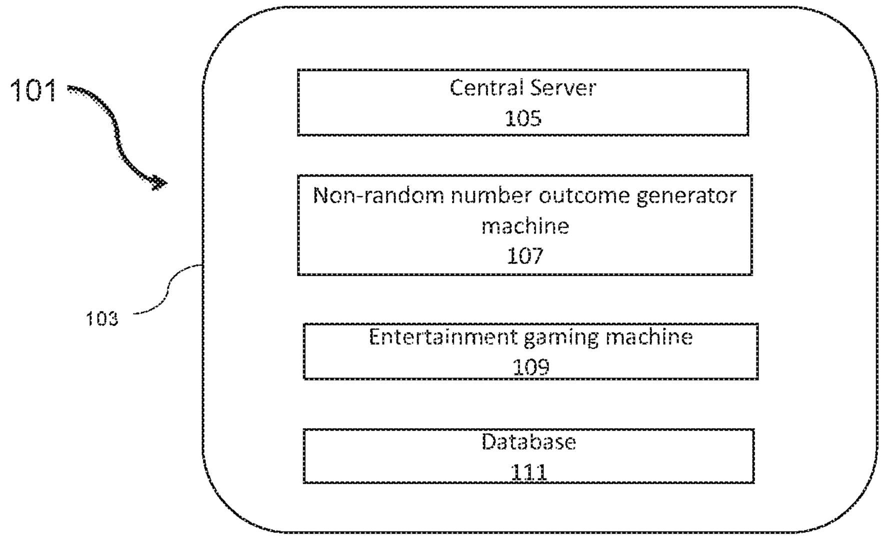
FIG. 1 illustrates a block diagram of the entertainment gaming system for transforming a non-random number outcome into an entertainment gaming outcome, in accordance with an embodiment of the present subject matter.

The present disclosure is best understood with reference to the detailed figures and description set forth herein. Various embodiments have been discussed with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

An entertainment gaming system and method are disclosed for transforming a non-random number outcome into an entertainment gaming outcome. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

Although the present disclosure has been described with the purpose of transforming a non-random number outcome into an entertainment gaming outcome, it should be appreciated that the same has been done merely to illustrate the invention in an exemplary manner and any other purpose or function for which explained structures or configurations can be used, is covered within the scope of the present disclosure.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer program product) may be stored in a machine-readable medium. A processor(s) may perform the necessary tasks.

FIG. 1 illustrates a block diagram 101 of the entertainment gaming system 103 for transforming a non-random number outcome into an entertainment gaming outcome, in accordance with an embodiment of the present subject matter. The entertainment gaming system 103 comprises a central server 105, a non-random number outcome generator machine 107, an entertainment gaming machine 109, and a database 111.

The central server 105 is communicatively coupled with the non-random number outcome generator machine 107 and the entertainment gaming machine 109 which further comprises a controller. Examples of the non-random number outcome generator machine 107 including but not limited to a stock or securities trading computing machine, a high-frequency trading computing machine, and a high volatility ETF machine. The entertainment gaming system 103 is configured to collect non-random number based outcome from real-world events such as but not limited to stock or securities trading, high-frequency trading, high volatility ETF, etc. and transmitting it to the central server 105.

The central server 105 comprises a transceiver to receive non-random number outcome from the real-world event. The central server 105 further utilizes an algorithm to process the received non-random number outcome into an entertainment gaming outcome. Further, the present entertainment gaming system 103 comprises a database 111 to store the received real-world non-random number based outcome and processed entertainment gaming outcome generated from the received non-random number based outcome. The central server 105 then transmits the processed outcome in the form of an entertainment gaming outcome to the entertainment gaming machine 109 to generate and render a game result.

Entertainment gaming system 103 provides a gaming experience that may include playing on any platform through which random events can be simulated, such as electronic table games, video games and online gaming machines; such as online games of skill (played through terminals), personal computers or mobile devices.

In one embodiment, the market data such as movements or changes, which may be general changes or changes relative to specific positions, are translated into different forms of random events including triggering encounters in a skill based game or dictating the outcome of a decision or results of a decision on an online video game machine which can then be displayed to players.

In another embodiment, the market data may form the basis for determining outcomes relative to input received through an interface of the invention which can then be simulated as skill-based games and outcomes through any of the aforementioned platforms of the present invention.

The above gaming experience includes individual skill based game targets. In an exemplary embodiment, the player enters a challenge (for example a video game obstacle course) with milestones and the reward for each milestone is participation in one or more outcomes from the real world non-random number outcome generator machine such as but not limited to stock or securities trading computing machine, high-frequency trading computing machine, high volatility ETF etc.

The present entertainment gaming system 103 provides a number of variants of the game, from no skill to highly skilled. In the no-skill version, the present entertainment gaming system 103 hides the financial instrument(s) being used in the game from the user. In the high skill version, the present entertainment gaming system 103 allows the user to pick one or more instruments as well as whether to take the call or put side (predicting whether the instrument will go higher or lower over the short term option period). In this version, the users or players can also choose the option chain breakpoints and caps that they desire.

In between these two extremes, the present entertainment gaming system 103 generates different bundles of short-term capped options that have varying volatility/hit rate/paytable profiles. The user can then choose the profile that best fits their desired entertainment experience.

In another version, the present entertainment gaming system 103 displays the historical performance of different bundles of short-term capped options and let the users use the history to try and guess the future performance of the bundles; then they select which bundle they would like to purchase.

By leveraging large numbers of instruments and call/put choices, the present entertainment gaming system 103 can mathematically approximate the paytables of essentially any slot machine. In an embodiment, a visual device can be placed on top of the NRNG version of these mathematical models to make the entertainment investment feel like a gambling device, even though it is not based on a random number. Similarly, this could also be made to look like an electronic card-based game (e.g., blackjack) by employing methods of banking the NRNG outcomes and spreading the display of these outcomes across multiple plays of blackjack Finally, this could be integrated with existing slot machines/online video games as a bonus feature.

In the versions described above, the present entertainment gaming system 103 is essentially banking the sale of these short-term capped options. In an exemplary operation, the present entertainment gaming system 103 may resolve the option at the end of the short period of the investment and paying out the complete value of the option to all the purchasers.

In a pooled version, the present entertainment gaming system 103 may buy and sell these options available to the general public, and act solely as an intermediary. The "buy" side of the options are highly volatile and over the long run lose money, but they carry the excitement of an entertainment investment. The "sell" side is very low volatility and over the long run gain money, thus is seen more like a boring but profitable investment in the long run.

To keep both the sides balanced, the present entertainment gaming system 103 may encourage or discourage more users to enter the "sell" side by increasing or decreasing the margin on the product (the bundle of financial instruments driving the NRNG engine). Further, the present entertainment gaming system 103 could develop different pools of sellers with restrictions on how much they can invest tied to their participation in the buy side. The present entertainment gaming system 103 could create a bit of a virtual cycle here, encouraging users who enjoy the buy-side entertainment investment to let their bank of money sitting on the sell side when they are not actively playing the buy side.

In a serial version described, the present entertainment gaming system 103 may create a long line of option bundles that are hedged against each other. So some bundles will payout precisely when other corresponding bundles do not. The present entertainment gaming system 103 performs this operation in a way that the total expected payout percentage of all the bundles is less than 100%, then randomly assign these bundles to all the available players.

Further, the present entertainment gaming system 103 tracks the event by utilizing Blockchain technology to provide maximum transparency to the NRNG engine. The present entertainment gaming system 103 can track the outcome of every payout in a blockchain, thus allowing every user access to the full details of how the engine is performing and what the paytables are proving to be as the games are being played.

The present disclosure further describes the paytable details. Typically, in a market mania, the player of the game experiences an interaction through the user interface that is mathematically similar to a gambling experience on a regular slot machine. While a regular slot machine uses a random number generator to determine the outcome of the gambling activity, the embodiment discussed herein provides a game outcome based on the results of activity on derivative, option, stock, or other securities trading occurring independently via computing machine, high-frequency trading computing machine, high volatility ETF, etc. One advantage of this method is that all parties can win in the gaming experience provided by embodiments of the invention in a similar way to that all investors can gain responsive to market activity, such as if the market increases.

The type of trading on the securities can involve complex positions taken using derivatives such as call or put options to build models, including but not limited to a straddle, that alters the risk profile of the operator of the gaming experience. These positions can also be used to alter the results of the gaming experience. For example, market fluctuations or unusual movements in the call or put options may be used to simulate the experience of winning a jackpot. In one embodiment, the algorithm for these complex positions will take into account historical volatility profiles of a large number of equities and calculate high-frequency pricing of extremely short-term call or put options (for example, 8 seconds)—while simultaneously taking positions to protect the entertainment gaming seed funding from extreme market moves. This algorithm combines advanced probability theory and statistics with advanced financial trading theory.

In an implementation, the NRNG acts as a replacement for traditional pseudo-random number generators, meaning that any game or system with a number generator that exists outside the game in some capacity is extremely easy to replace. An external random number generator for any game can be replaced with NRNG, and the game will run the same as it had previously. For example, GameCo is moving to a server-based architecture. Hence, NRNG can be implemented next to the class II server in place of a traditional pseudo-Random Number Generator.

The present invention utilizes NRNG to expand the range of any game that uses it outside of traditional gambling areas. For Skill-Based Games with an element of a chance this could mean placing games in any number of locations that were previously off limits due to regulations on pseudo Random Number Generators. The NRNG turns the games into ones that are strictly skill based, without the use of a pseudo-random number generator. The present invention can be implemented in public places.

In an additional architectural embodiment, the present entertainment gaming system 103 utilizes a smart contract which is issued to the player that understands how to read the market movements and determine the outcome. For example a smart contract with an outcome that follows the paytable similar to the server based embodiment. The smart contract is sent to the player who where it is held in their crypto wallet, in one embodiment this wallet is managed by the game. The game outcome is then determined after some period, in one embodiment 8-10 seconds, based on the results from the smart contract.

In an additional embodiment, the present invention provides a less volatile gaming outcome. In skill-based gaming with an element of a chance, there is a need for constant random events. These random events, such as the direction of movement of a computer controlled adversary or the shape of a block in falling blocks game or the type of attack of a boss character, require a less volatile shorter term result. In one embodiment the spread of results is one of 6 possible outcomes (similar to a six-sided dice) each of these outcomes is equally likely. The market movements are used at a much higher frequency to show the deterministic outcome of the gaming event.

Thus the present invention converts any pRNG games into a non-random number generator (NRNG) driven games.

Figure 2:
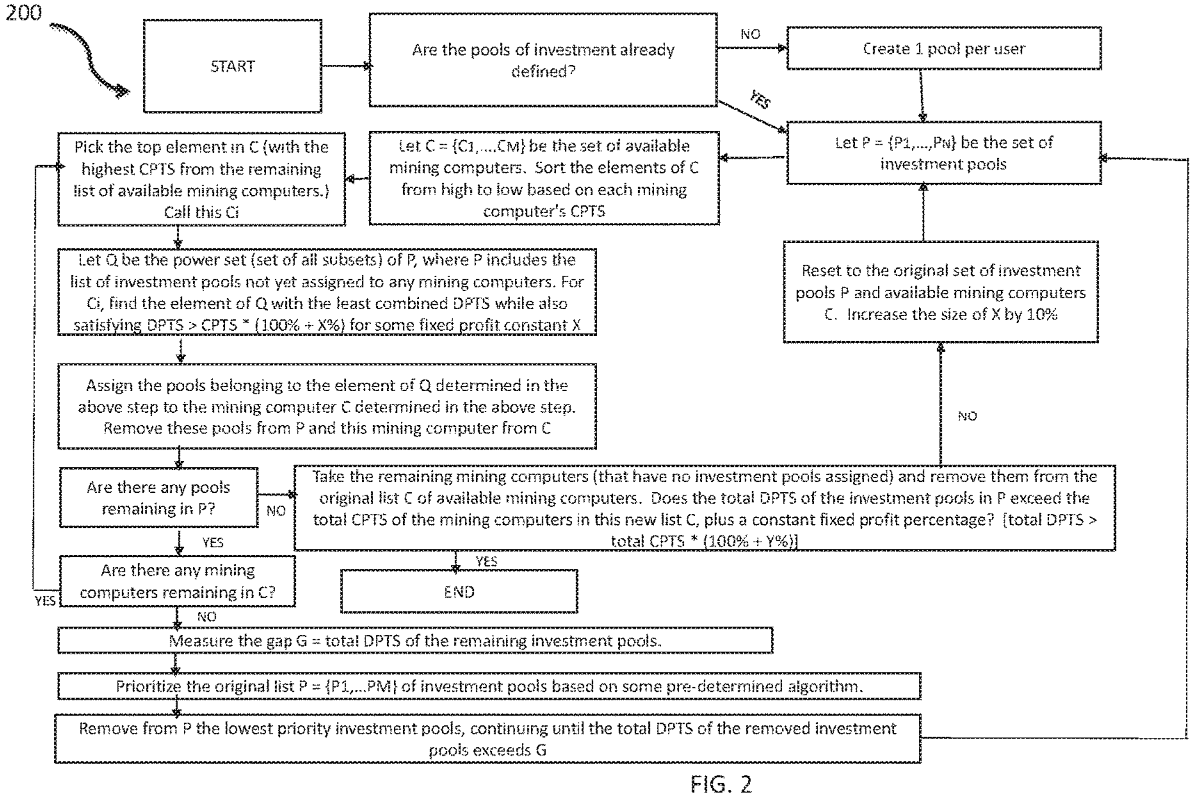
FIG. 2 illustrates a flowchart of the optimization algorithm utilized in the present method to intelligently size a plurality of mining computers and further assign the mining computers corresponding to a pool of a plurality of users, in accordance with an embodiment of the present subject matter.

FIG. 2 illustrates a flowchart 200 of the optimization algorithm utilized in the present method to intelligently size a plurality of mining computers and further assign the mining computers corresponding to a pool of a plurality of users, in accordance with an embodiment of the present subject matter. The successful mining efforts are shared amongst the miners. The size of the pool impacts two factors such as the strike frequency and the payout per miner. For instance, on a pool with the miners of the same capability, larger pools will strike more frequently and have smaller shared mining amounts. The total amount is shared between all the miners in the corresponding pool. Then the present method utilizes the crypto mining to create an entertaining game so that the user may invest for short-term in mining pools to generate a paytable that may simulate a gaming outcome.

As shown in FIG. 2, the present method initiates with a step of creating a series of pools, based on the size of the investment from the users. Thus the present method provides pools $P_1$-$P_N$ of the user investment dollars. The size of these pools varies and do not have the same size. Additionally, the mining computers $C_1$-$C_M$ are available to be bought and/or leased.

Each computer has a cost to own/run that can be converted into Cost Per Ten Seconds (CPTS). Pooled investments can be converted into Dollars Per Ten Seconds (DPTS), which is the average dollars over a given ten second period that are in the fund. For a given 10 second period, the pools $P_1$-$P_N$ can be calculated in terms of DPTS and the computers $C_1$-$C_M$ cost can be calculated in terms of CPTS. The time period ten seconds could be variable and could be any time period. Thus there is a function f(P,C)=E where P={$P_1$-$P_N$} and C={$C_1$-$C_M$ } and E is the error function resulting from the fact that the pools and the computers are discrete, so it is impossible to assign pools and computers perfectly.

In an embodiment, the method performs at least three steps to compute the error function (E). The initiates with the first step of sorting the elements of C from high to low in terms of CPTS. Then the method includes the second step of taking the first element of C, and all sets consisting of elements in P (also known as the power set of P). Further, finding the set of elements in P where the total DPTS of the set is closest to the CPTS of the first element of C, while also satisfying DPTS>CPTS. Then the method includes the third step of removing the elements used in the second step from the whole process and repeating all the three steps again.

In an exemplary embodiment, more computers may need to be added to accomplish the aforementioned process. However, if more computers are not available, the excess DPTS is measured, and the users will have their investments returned based on a priority queue. This priority queue could be based on a plurality of forms which include but not limited to size, recency, or historical behavior (e.g., loyalty) of the user or on being selected to participate in the special mining club.

Operationally, the overall process could still be unprofitable (total CPTS>total DPTS) if E (the CPTS of the last machine in C minus the DPTS of the last element(s) from P in the process) is too large. Therefore, the present method executes the process iteratively. The present method takes E after the process was run, add in a "profit factor" of appropriate size (e.g. 10% of total DPTS) and add this number to the CPTS of each element of C, with weighting based on the size of the CPTS of each machine (more expensive machines get a larger number added to its cost). At the end of each iteration, the present method measures the total DPTS—total CPTS. If it exceeds a certain percentage of total DPTS (e.g., 5%), then the process completes, and the function is completed.

For any investment I (which can be in dollars, the mined cryptocurrency, other crypto tokens, or other currencies) over time T, the user will have their investment assigned to a computer $C_i$. During the time T, the user has their investment returned to them (R) based on how many cryptocurrencies the computer $C_i$ was able to mine. Over longer periods, the user may have their investment move from computer to computer. This return R can then be kept in the mined cryptocurrency, or it can be converted to another currency such as the dollar, another crypto token, or another currency, or any other form of payment.

There are at least 2 ways to compute the return R. In one embodiment, the present method utilizes a simple average, where the method computes the ratio of the users investment to the total investment of all the pools assigned to that computer, and return this ratio times the amount of cryptocurrency mined during time period T. In another embodiment, users are put into pools with shares of equal size (although a user may have more than one share). During any given 10 second time period, these shares are placed side-by-side in time increments, down to the nano-second. The moment a successful mine occurs, the share assigned to the time increment that contains that moment in time is awarded the mined cryptocurrency.

To create a non-random number generator (NRNG), the present method converts each transaction into hashes. The computers are generating large quantities of hashes, which then get assigned to the pools of users. Some hashes will produce cryptocurrencies; most will not. The NRNG is fully controlled by access to one or more different sized pools for a given user. If the user is in a smaller pool, it is less likely that they will have a successful hash, but because the pool is smaller, they will get a bigger share of the cryptocurrency when successfully mined. Thus there is higher volatility. Similarly larger pools lead to lower volatility. Thus the present method can create any math model by using different combinations of pool sizes for the user's investment.

Further, there are additional metrics utilized by the present method to define the pools such as frequency ten seconds (FT S), strike amount, pool size (PS), and strike amount per miner. Frequency ten second (FTS) is the probability of a mining strike being given in a ten second period. Strike amount is the total value of a single mining strike. Pool Size is the total size of the pool (specifically the number of miners). Strike amount per miner (SMPM) is the value of each strike that is issued to each miner, typically a part of a cryptocurrency.

A set of variable pool sizes are used to generate the paytable, with an example shown in Table 1.

TABLE 1

| Pool Size | Amount | Frequency ten seconds |
|---|---|---|
| 10,000 | 15,000 | 0.16 |
| 1,000 | 15,000 | 0.016 |
| 100 | 15,000 | 0.0016 |

The optimization algorithm used in the present method needs a set of pools where the different sizes of the pool can be used to generate frequent (large pool) and infrequent (small pool) mining results. These results can then be applied to create an entertainment game, for example, a paytable, shown in Table 2.

TABLE 2

| WIN | 1 COIN | 2 COINS | 3 COINS |
|---|---|---|---|
| Red 7, white 7, blue 7 | 2400 | 4800 | 10000 |
| Red 7, red 7, red 7 | 1199 | 2400 | 5000 |
| White 7, white 7, white 7 | 200 | 400 | 600 |
| Blue 7, blue 7, blue 7 | 150 | 300 | 450 |
| Any 3 sevens | 80 | 160 | 240 |
| 1 bar, 2 bar, 3 bar | 50 | 100 | 150 |
| 3 bar, 3 bar, 3 bar | 40 | 80 | 120 |
| 2 bar, 2 bar, 2 bar | 25 | 50 | 75 |
| Any red, any white, any blue | 20 | 40 | 60 |
| 1 bar, 1 bar, 1 bar | 10 | 20 | 30 |
| Any 3 bars | 5 | 10 | 15 |
| Any 3 reds | 2 | 4 | 6 |
| Any 3 white | 2 | 4 | 6 |
| Any 3 blues | 2 | 4 | 6 |
| Blank, blank, blank | 1 | 2 | 3 |

Thus the present system and method size each group of mining computers so that the mining computers correspond to the number of users assigned to a pool. The present method and system also minimize the error function of the discrete injection function between the pools and the mining computers. Additionally, the present method and system create a game where a short-term investment in one or more mining pools to generate a paytable that simulates the gaming outcome.

Figure 3:
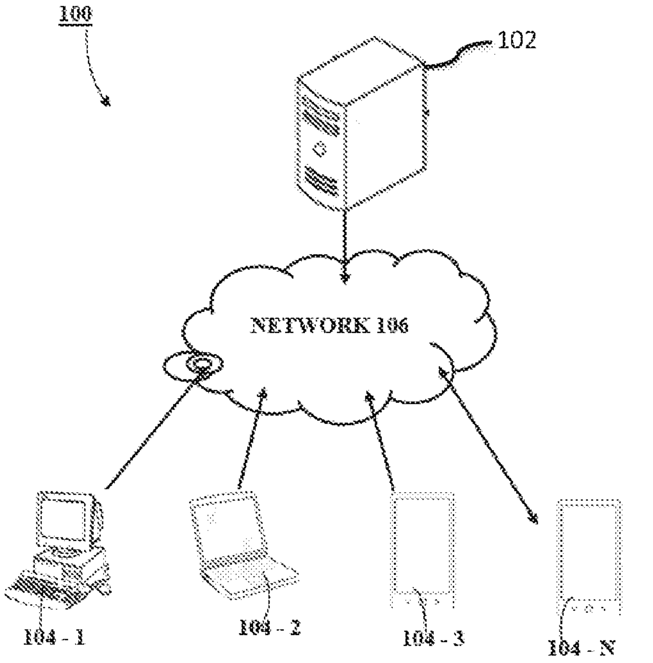
FIG. 3 illustrates a network implementation of the present system and method to provide an integrated platform to facilitate online casino game and land-based casino game over a network, in accordance with an embodiment of the present subject matter.

FIG. 3 illustrates a network implementation 100 of the present system and method to provide an integrated platform to facilitate online casino game and land-based casino game over a network, in accordance with an embodiment of the present subject matter. Although the present subject matter is explained considering that the present system 102 is implemented on a server, it may be understood that the present system 102 may also be implemented in a variety of computing systems, such as a laptop computer, a desktop computer, a notebook, a workstation, a mainframe computer, a server, a network server, and the like. It will be understood that the present system 102 may be accessed by multiple users through one or more computing devices 104-1, 104-2 . . . 104-N, collectively referred to as computing unit 104 hereinafter, or applications residing on the computing unit 104. Examples of the computing unit 104 may include but are not limited to, a portable computer, a personal digital assistant, a handheld device, and a workstation. The computing units 104 are communicatively coupled to the present system 102 through a network 106.

In one implementation, the network 106 may be a wireless network, a wired network or a combination thereof. The network 106 can be implemented as one of the different types of networks, such as an intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 4:
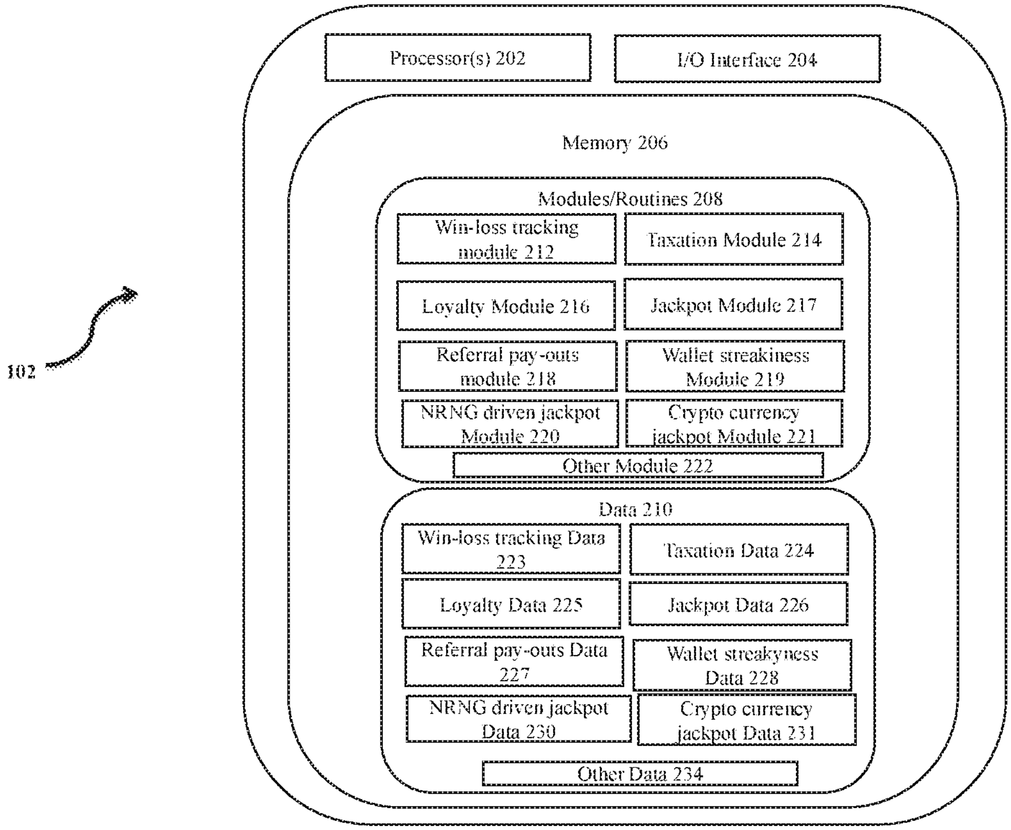
FIG. 4 illustrates the proposed system to provide an integrated platform to facilitate online casino game and land-based casino game over a network, in accordance with an embodiment of the present subject matter.

FIG. 4 illustrates the proposed system 102 to provide an integrated platform to facilitate online casino game and land-based casino game over a network, in accordance with an embodiment of the present subject matter. Referring now to FIG. 2, the system 102 is illustrated in accordance with an embodiment of the present subject matter. In one embodiment, the system 102 may include at least one processor 202, an input/output (I/O) interface 204, and a memory 206.

The processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the computing unit 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or another server.

The memory 206 may include any computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a win-loss tracking module 212, a taxation module 214, a loyalty module 216, a jackpot module 217, a referral pay-outs module 218, a wallet streakyness module 219, a non-random number generator (NRNG) driven jackpot module 220, a cryptocurrency jackpot module 221 and other module 222. The other modules 222 may include programs or coded instructions that supplement applications and functions of the system 102.

The data 210, amongst other things, serves as a repository for storing data processed, received, and generated by one or more of the modules 208. The data 210 may also include a win-loss tracking data 223, a taxation data 224, a loyalty data 225, a jackpot data 226, a referral pay-outs data 227, a wallet streakyness data 228, a non-random number generator (NRNG) driven jackpot data 230, a cryptocurrency jackpot data 231 and other data 234. The other data 234 may include data generated as a result of the execution of one or more modules in the other module 222.

In one implementation, the win-loss tracking module 212 is configured to track the wins and losses on a cryptocurrency bet. The win-loss tracking module 212 utilizes blockchain mechanism so that each time a game is played the blockchain is extended to show the outcome of the gaming event. Further, each time a coin (or partial coin) transfers ownership due to a gaming event the win-loss relationship is tracked. The blockchain mechanism consists of a smart contract that allows the public ledger to have full knowledge of the gaming-related transactions that occurred with this currency. This public ledger can then be researched by anyone to determine the win/loss percentages of all casinos that accept the currency as part of their gaming offering. The detailed transaction data is available, allowing for reporting such as long-term hold percentages, streakiness, and volatility patterns, and other key outcome casino data, all available to the public. In one embodiment, a trusted third party holds the key to translating the anonymous transactions into meaningful named-casino reporting.

In one embodiment, a separate smart contract/open source piece of software holds the key to translating the anonymous transactions into meaningful named-casino reporting. The blockchain embellished with the additional information holding the results of a sequence of games. This mechanism can also be incorporated into a game that must spend currently gambled coin (cryptocurrency) before others are added. This means that the coin will show how lucky it is.

Further, the taxation module 214 is configured to pay taxes on a plurality of betting events automatically. The taxation module 214 utilizes the blockchain smart contract which directly applies the taxation requirements as each transaction occurs. Further, the blockchain smart contract contains all data required for taxation reporting and (possibly open source) program accompanies the blockchain to produce taxation reporting requirements automatically and supporting documentation. In one embodiment, the specific taxation details of a pre-determined list of governments are encoded in the smart contract of the blockchain. Only casinos from these jurisdictions will be able to participate in the use of this currency. The smart contract includes detailed plans for a currency fork whenever a jurisdiction materially changes their gaming taxation laws.

Also, the smart contract will include detailed plans for a currency fork whenever a casino proposes opening in a new jurisdiction. Examples of the tax records that need to be kept as part of the smart contract transaction include but not limited to casino location, customer location, amount wagered, amount won or lost by the customer, the timestamp of the wager. In another embodiment the smart contract generically tracks all meaning financial data associated with the gaming transactions, and a piece of software is available that takes a user and their anonymous key, reads the public ledger of the blockchain, applies the applicable taxation laws, and produces a report for the user of their tax requirements and supporting documentation. The software utilized by the present invention then permanently deletes the anonymous key.

The loyalty module 216 is configured to build loyalty points as a blockchain, and further allows users to transfer loyalty points. In an embodiment, the loyalty points are tracked via a smart contract assigned to the blockchain cryptocurrency, customers and companies' alike benefit from the transparent/transferrable loyalty program. The program starts when a customer makes a purchase or otherwise engages in a transaction with a company that is participating in the cryptocurrency and its associated loyalty program. The engage of cryptocurrency with the company triggers a transfer of the loyalty points currency (of equal currency amount) which contains the loyalty points and the smart contract needed to exchange/redeem/expire these loyalty points. Upon redemption or expiration, the loyalty currency expires, as dictated by the smart contract. The loyalty currency is transferable, and can also be sold at a market-determined price, either for crypto or government-backed (fiat) currency. The loyalty cryptocurrency consists of a blockchain with a smart contract programmed to handle the loyalty points. When loyalty points are earned, they are distributed via the loyalty currency. When loyalty points are redeemed/expires the smart contract triggers the destruction of the associated currency. The smart contract controls the issuance and redemption/expiration of the loyalty currency.

In operation, the blockchain currency comes with a smart contract designed to track loyalty points. In one embodiment, the companies that offer loyalty points for the use of the currency is determined ahead of time. In one embodiment, a new currency is produced (or forked) for each company that wants to offer loyalty points for the use of the currency. In one embodiment, one or more "global loyalty programs" is assigned to one or more currencies and companies can choose to register with these programs to issue loyalty points for the use of the currency with the company. The loyalty points are part of the smart contract, and in one embodiment can be expired only when used in a manner determined and stored in the smart contract. In another embodiment, the loyalty points can be expired at a pre-determined time. In another embodiment, there is a "global redemption program" assigned to one or more currencies and companies can choose to register with this program for redemption of these loyalty points. The smart contract tracks not only the currency but also the active/redeemed/expired state of the loyalty points associated with the currency. The public ledger allows for complete transparency of these loyalty programs. The currency allows for these loyalty programs to be completely transferrable.

The jackpot module 217 integrated with the land-based casino to utilize a plurality of unusual crypto events in blockchain mining to drive large jackpots. In an embodiment, the land-based casino spends a portion of the player's deposit on processing power. Further, the land-based casino machine is already invested in this power and if the player hits the correct combination wins a pool of the previous earnings of the land-based casino machine. The smart contract provides the ability to allocate percentages of purchase and subsequently accounts for the payouts if need be.

The referral payouts module 218 is configured to pay affiliate payouts on a plurality of gambling events directly to the public blockchain. In an embodiment, the smart contract directly applies the affiliate pay-out each time a transaction occurs. The affiliate pay-out is stored in the blockchain and paid out at regular intervals to the relevant affiliate. In operation, the blockchain tracks where people received their coin, and if they were directed from an affiliate, then the affiliate is paid accordingly. In one embodiment, the affiliate is paid a percentage of what the recommended person is using. In another embodiment, the affiliate is paid a flat rate per person that they recommend and subsequently tries the service.

The wallet streakyness module 219 stores the win-loss history in public ledger, and trigger a winning response by smart contract. In an embodiment, each time a game is played the blockchain is extended to show the outcome at which point it is determined whether the player is on a streak and what to do about said streak. Further, the streakyness of the coin is used rather than the streakyness of the player. The streakyness can be wins, losses or combinations of the two. When games are played the outcome is recorded, and after a set amount of losses or wins in a given period a player is awarded predetermined benefits. In one embodiment, the wallet streakyness module 219 presents itself as a pity timer of sorts, where if a player is on a losing streak, their odds of winning are increased. In another embodiment, the players can use their earned loyalty points to rig the odds in their favor in a current round. In another embodiment, the players that continue to lose will have the option to hedge their bets if a round of the game looks to be a lost cause.

The non-random number generator (NRNG) driven jackpot module 220 is configured to convert cryptocurrency and play out a ten-second event. In an embodiment, the non-random number generator (NRNG) is built by looking at market values over a certain period. Further, the NRNG is built into the machine and can be accessed offline. Additionally, the pay-out can be in a currency of the winners' choice. In an embodiment, the smart contract takes in the money that is given converts it into a playable currency, then returns winnings in the form of the initial currency.

The cryptocurrency jackpot module 221 is integrated with a plurality of gaming devices to award cryptocurrency as part of special bricks and mortar jackpots. In an embodiment, if the present cryptocurrency jackpot module is integrated with a gaming device, the random number generator (RNG) of the gaming device directly determines when a crypto jackpot is to be awarded. In another embodiment, if the present cryptocurrency jackpot module is not integrated with the gaming device and acts as a separate application, a plurality of gaming devices are connected to the cryptocurrency jackpot module. The outcomes of the gaming device, including but not limited to a streak of losses, can trigger the application to award the crypto jackpot to one or more gaming users. In another embodiment, the present invention may function as a separate application which is available to the table games dealers/pit bosses/other employees as appropriate. Outcomes of the table game (for example, an outlier event like a royal flush is achieved on three card poker) trigger the employee to notify the application of the award and the user to receive the award. In another embodiment, the cryptocurrency jackpot module 221 may operable as a separate application that connects to one or more physical table games manually. The cryptocurrency jackpot module 221 may or may not be tied to the casino rewards program to identify users, determine eligibility and nature of available jackpots, and process the awarding of a cryptocurrency jackpot directly to the user's electronic cryptocurrency wallet.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device and implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

In some embodiments, the methods, systems, and media disclosed herein include at least one computer program, or use of the same. A computer program includes a sequence of instructions, executable in the digital processing device's CPU, written to perform a specified task. In some embodiments, a computer program includes a web application. In light of the disclosure provided herein, those of skill in the art will recognize that a web application, in various embodiments, utilizes one or more software frameworks and one or more database systems. In some embodiments, a computer program includes a mobile application provided to a mobile digital processing device. In some embodiments, a computer program includes a standalone application, which is a program that is run as an independent computer process, not an add-on to an existing process, e.g., not a plug-in. In some embodiments, the computer program includes a web browser plug-in.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. In some embodiments, these computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified herein, or in the flowchart and/or block diagram block or blocks.

Those skilled in the art will appreciate that the order of execution or performance of the operations in the embodiments of the invention illustrated and described herein may not be essential unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This gaming experience can be extended to competitive play, for example different players could complete for a shared bonus payment. Two methods to implement the competitive play include some player skill component based on representation of the market movements or completely random events based on market movements.

The gaming experience can be extended to social media with rendering of events such as gaming outcomes to social media platforms.

This gaming experience can be extended to individual skill based game targets. In one embodiment the player enters a challenge (for example a video game obstacle course) with milestones and the reward for each milestone is participation in one or more outcomes from the real world non-random number outcome generator machine such as but not limited to stock or securities trading computing machine, high-frequency trading computing machine, high volatility ETF etc.

It will be apparent to persons skilled in the art that numerous variations and/or modifications may be made to the present invention as shown in the specific embodiments without departing from the spirit or scope of the invention as broadly described. The above described embodiments are intended to illustrate the principles of the invention, but not to limit the scope of the invention.

A controller, computing device, or computer, such as described herein, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system or incorporated in an existing system or device. Systems of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as users, content providers and operators thereof are provided with useful access thereto, either through a mobile device, system, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. A gaming system comprising:

a central server in communication with a real world non-random number outcome generator machine for receiving one or more non-random number based outcomes in connection with a real world event;

a controller configured to associate the non-random number based outcomes with game outcomes in a game displayed on a display device of a gaming machine, the game being displayed as a game of chance on the display device, wherein the non-random number based outcomes are selected by the controller independently of the game displayed on the display device, the non-random number based outcomes comprising one or more items having a volatile value independently of the game, wherein responsive to the controller detecting a triggering event in the game, the controller processes the non-random number based outcomes in combination with an algorithm, the algorithm determining a probable future value for the one or more items based on a historical volatility of the one or more items, the controller comparing the probable future pricing with the non-random number based outcomes to determine a game outcome in the game displayed on the display device without a payback percentage; and a communication device configured to transmit the game outcome to the gaming machine, wherein the game outcome is displayed on the display device as a game result of the game displayed on the display device.

2. The gaming system of claim 1, wherein the triggering event comprises the gaming machine receiving credit for enabling game play of the game.

3. The gaming system of claim 1, wherein the triggering event comprises receiving a selection to play the game.

4. The gaming system of claim 1, wherein the triggering event comprises receiving a selection during play of the game.

5. The gaming system of claim 1, wherein the controller records the game outcome, the game outcome being one of a winning outcome or a losing outcome.

6. The gaming system of claim 1, wherein the controller identifies a streak comprising at least a preset amount of game outcomes, the preset amount of game outcomes being one of two or more winning outcomes, two or more losing outcomes or a preset combination of winning outcomes and losing outcomes.

7. The gaming system of claim 6, wherein the controller facilitates the distribution of an award, the award being displayed on the display device responsive to the identification of the streak.

8. The gaming system of claim 6, wherein the preset amount of game outcomes comprises the two or more winning outcomes occurring in two or more consecutive game outcomes.

9. The gaming system of claim 6, wherein the preset amount of game outcomes comprises the two or more losing outcomes occurring in two or more consecutive game outcomes.

10. The gaming system of claim 6, wherein the preset amount of game outcomes comprises the preset combination of winning outcomes and losing outcomes occurring in four or more consecutive game outcomes.

11. The gaming system of claim 6, wherein the preset amount of game outcomes comprises the two or more winning outcomes occurring over a preset plurality of game outcomes.

12. The gaming system of claim 6, wherein the preset amount of game outcomes comprises the two or more losing outcomes occurring over a preset plurality of game outcomes.

13. The gaming system of claim 1, wherein the one or more items having a volatile value independently of the game comprise one or more securities positions.

14. The gaming system of claim 1, wherein the one or more items having a volatile value independently of the game comprise one or more cryptocurrencies.

15. A gaming system comprising:

a central server in communication with a real world non-random number outcome generator machine for receiving one or more non-random number based outcomes in connection with a real world event;

a controller configured to associate the non-random number based outcomes with game outcomes in a game displayed on a display device of a gaming machine, the game being displayed as a game of chance on the display device, wherein the non-random number based outcomes are selected by the controller independently of the game displayed on the display device, the non-random number based outcomes comprising one or more items having a volatile value independently of the game, wherein responsive to the controller detecting a triggering event in the game, the controller processes the non-random number based outcomes in combination with an algorithm, the algorithm determining a probable future value for the one or more items based on a historical volatility of the one or more items, the controller comparing the probable future pricing with the non-random number based outcomes to determine a game outcome in the game displayed on the display device without a payback percentage; and a communication device configured to transmit the game outcome to the gaming machine, wherein the game outcome is displayed on the display device as a game result of the game displayed on the display device, wherein the controller identifies a streak comprising at least a preset amount of game outcomes, the preset amount of game outcomes being one of two or more winning outcomes, two or more losing outcomes or a preset combination of winning outcomes and losing outcomes.

16. The gaming system of claim 15, wherein the controller facilitates the distribution of an award, the award being displayed on the display device responsive to the identification of the streak.

17. The gaming system of claim 15, wherein the preset amount of game outcomes occurs in consecutive game outcomes.

18. The gaming system of claim 15, wherein the preset amount of game outcomes occurs in a preset plurality of game outcomes.

19. The gaming system of claim 15, wherein the one or more items having a volatile value independently of the game comprise one or more securities positions.

20. The gaming system of claim 15, wherein the one or more items having a volatile value independently of the game comprise one or more cryptocurrencies.

* * * * *